United States Patent [19]

Frees et al.

[11] Patent Number: 4,759,842

[45] Date of Patent: Jul. 26, 1988

[54] IN-LINE FUEL FILTERING DEVICE

[76] Inventors: David Frees, 5407 Amestoy Ave., Encino, Calif. 91316; Edwin L. Schwartz, 32132 Canyon Ridge Dr., Westlake Village, Calif. 91361

[21] Appl. No.: 937,738

[22] Filed: Dec. 4, 1986

[51] Int. Cl.$^4$ .................... B03C 1/02; B01D 27/08; B01D 35/06

[52] U.S. Cl. .................... 210/94; 210/223; 210/232; 210/446; 210/453

[58] Field of Search .......... 123/536, 538, 196 A; 210/94, 222, 223, 350, 352, 435, 436, 446, 232, 448, 453

[56] References Cited

U.S. PATENT DOCUMENTS

| | | | |
|---|---|---|---|
| 3,000,504 | 9/1961 | Pfeiffer | 210/94 |
| 3,002,870 | 10/1961 | Belgarde et al. | 210/94 X |
| 3,325,009 | 6/1967 | Botstiber et al. | 210/223 X |
| 3,371,790 | 3/1968 | Kudlaty et al. | 210/223 |
| 3,550,776 | 12/1970 | Hamilton | 210/94 |
| 3,815,744 | 6/1974 | Vanderpoel | 210/94 |
| 3,841,489 | 10/1974 | Combest et al. | 210/223 |
| 3,890,232 | 6/1975 | Combest et al. | 210/223 |
| 4,036,758 | 7/1977 | Combest | 210/223 |
| 4,538,582 | 9/1985 | Wakuta | 210/222 X |

Primary Examiner—Richard V. Fisher
Assistant Examiner—W. Gary Jones
Attorney, Agent, or Firm—Henry M. Bissell

[57] ABSTRACT

The in-line fuel filter device is readily installable in the fuel line of a liquid fuel-supplied engine. Thus, it is useful to filter fuels such as gasoline, diesel, oil, etc. and includes a generally closed, preferably cylindrical casing having a pair of opposed inlet and outlet-bearing endwalls interconnected, preferably releasably interconnected, by preferably transparent sidewalls. The casing defines a central filtering space accessible through the inlet and outlet. A preferably cylindrical particle filter is held by an interior bracket spaced from the casing sidewall with one end thereof surrounding and sealed against the outlet, while the filter is spaced from the inlet. A plate closes the opposite end of the filter and is secured to a bar passing longitudinally through the casing and filter releasably threadably secured to ferrules extending outwardly from the casing endwalls, so that the casing is readily openable. A ring magnet is secured around the inlet in the central space without impeding fuel flow therethrough and a coil spring bears against the magnet and plate to help hold the components of the device in tight engagement. The device includes pairs of adaptors, each having an internal passageway therethrough, one end of the adaptor being threadably receivable in the ferrules and the opposite end being of various diameters to facilitate connection to fuel lines of various internal diameters.

5 Claims, 1 Drawing Sheet

IN-LINE FUEL FILTERING DEVICE

BACKGROUND OF THE INVENTION

1. Field of the Invention

The present invention generally relates to liquid filters and more particularly to an improved type of in-line fluid filter device.

2. Description of the Prior Art

Various types of in-line fuel filters have been employed to purify liquid fuels such as gasoline, diesel fuel, ethyl alcohol and the like. Such purification is necessary in order to remove rust, dirt, sand, scale and other solid contaminants occasionally present in fuels. Such contaminants could clog various engine components, including carburetor jets and other passages, resulting in loss of engine efficiency or downright interruption of engine performance.

Conventional in-line fuel filters have generally been difficult to install, inspect and remove and usually must be made in various sizes to fit fuel lines of various diameters. Most such filters are one-time-use devices; that is, they cannot be easily disassembled for cleaning and reuse. Many such filters are also bulky, with expensive components, yet are not very efficient in trapping metallic particles and the like. Such factors have increased the price of installation and use of in-line fuel filters. Many motorists do not utilize them on their vehicles, with consequent ultimate excessive engine wear.

There remains a need for an efficient, small, inexpensive, easily installable, inspectable, cleanable and reusable in-line fuel filter device capable of being employed with various types of fluid fuels in association with various types of motors. The device should be adaptable for installation in fuel lines of various diameters and should remove scale, dirt, sand and other wind-blown and entrained particles, as well as metallic particles, from the fuel with improved efficiency in order to fully protect engines and engine accessories from clogging and damage.

SUMMARY OF THE INVENTION

The improved in-line fuel filter device of the present invention satisfies all the foregoing needs. The device is substantially as set forth in the accompanying Abstract. Thus, it comprises a hollow, preferably cylindrical casing having spaced opposed first and second endwalls interconnected by closed transparent sidewalls defining therewith a central space. An inlet in one endwall and an outlet in the opposite endwall provide access to the central space. A preferably cylindrical particle filter of nylon or the like having porous filtering sidewalls and having open opposite ends is supported by a bracket in the central space, with one filter end sealed around the closing outlet and the opposite filter end pressed against and sealed by a bracket plate connected to a bar longitudinally extending through the filter and casing and threaded into ferrules extending outwardly from the inlet and outlet. The ferrules and endwalls are integral and the endwalls readily detach from the casing sidewalls by unscrewing the ferrules from the bar ends so as to provide ready access to the filter within the space, for replacement, cleaning and repair and reuse, if appropriate or necessary.

A ferrous metallic particle-attracting permanent ring magnet is seated in the central space secured to the endwall bearing the inlet and surrounds such inlet. The magnet is held in place by a spring, preferably a coil spring, braced between the magnet and the push plate of the support bracket. The spring has the effect of holding the casing components substantially tightly in place, thereby accommodating slight variations in dimensions of those components. The device is simple, efficient and inexpensive.

The device is supplied with multiple pairs of adaptors for mounting in a fuel line path. Each adaptor has a longitudinal central fuel passageway therethrough. A first end of each adaptor is externally threaded to screw into a ferrule, while the opposite, second end is adapted to press fit into the central passageway of a fuel line. The different pairs of adaptors differ from each other in the external diameter of the second ends, thereby accommodating fuel lines having various internal diameters.

Various other features of the improved filter device of the present are set forth in the following detailed description and accompanying drawings.

BRIEF DESCRIPTION OF THE DRAWING

A better understanding of the present invention may be had from a consideration of the following detailed description, taken in conjunction with the accompanying drawing in which.

DETAILED DESCRIPTION

FIGS. 1-7

Figure 1:
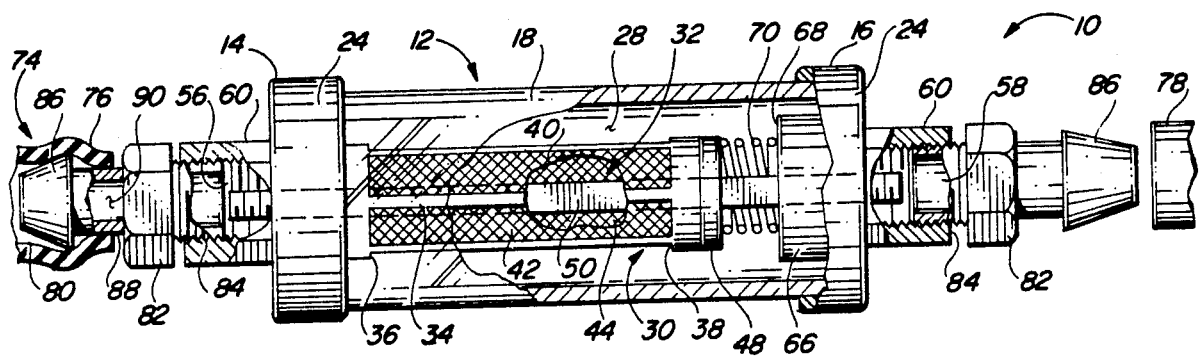
FIG. 1 is a schematic side elevation, partly broken away and partly in section, of a preferred embodiment of the improved fuel filter device of the present invention, shown with one end thereof connected to one portion of a fuel line and the opposite end thereof in line with another portion of that fuel line.

Now referring more particularly to the accompanying drawings, a preferred embodiment of the improved in-line fuel filter device of the present invention is schematically depicted therein. Thus, device 10 is shown in FIG. 1 as comprising a preferably generally cylindrical casing 12 having spaced vertical endwalls 14 and 16 interconnected through preferably transparent cylindrical sidewalls 18. Thus, for example, endwalls 14 and 16 may be of metal or hardened plastic or rubber, ceramic or the like and sidewalls 18 may be of tempered glass, clear plastic or other suitable material impervious to hydrocarbon compounds.

Figure 3:
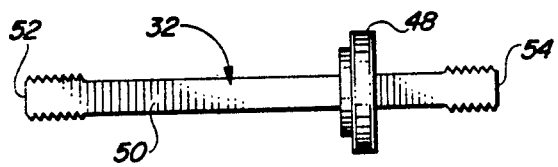
FIG. 3 is a schematic side elevation of the support bracket bar utilized in the device of FIG. 1.
Figure 5:
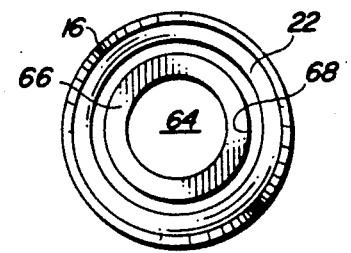
FIG. 5 is a schematic internal end view of the inlet end of the device of FIG. 1, showing the ring magnet thereof in place, but with the coil spring, support bar and adaptor removed therefrom.
Figure 6:
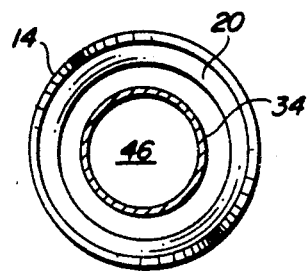
FIG. 6 is a schematic internal end view of the outlet end of the device of FIG. 1, showing the filter in place, but with the support bar and adaptor removed.

The opposite ends of sidewalls 18 are seated against O-ring seals 20 and 22 of rubber, plastic or the like (FIGS. 6 and 5) in grooves (not shown) in the interior surfaces of endwalls 14 and 16, respectively. Endwalls 14 and 16 have outer rims 24 and 26, respectively, which fit over, that is, closely overlap, the sides of the ends of sidewalls 18 to assure sealing engagement of endwalls 14 and 16 and sidewalls 18. They collectively define a central filtering space 28 in which filter 30 is releasably secured by a bracket 32 (FIG. 3).

Figure 7:
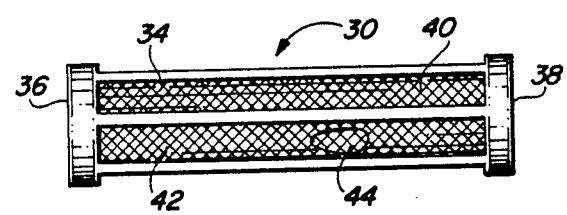
FIG. 7 is a schematic side elevation of the filter of the device of FIG. 1.

Filter 30 (FIGS. 1 and 7) comprises a hollow cylinder 34 having open opposite ends 36 and 38 and porous cylindrical filtering sidewall 40. Preferably, cylinder 34 comprises a light weight, inexpensive, durable material such as tetrafluoroethylene or nylon (polyamide) plastic which is fully chemically and physically resistant to the fuel to be filtered. Cylinder 34 could also be of metal, ceramic, cermet or other suitable material, and includes a plurality of filtering pores 42 in sidewall 40, providing access to the central cavity 44 in cylinder 34.

Figure 4:
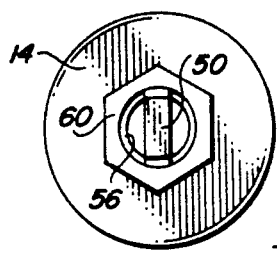
FIG. 4 is a schematic external end view of the device of FIG. 1, but with an adaptor removed from the ferrule thereof.

Cylinder 34 is releasably held inn space 28 spaced inwardly from sidewalls 18, with open end 36 of cylinder 34 pressed tightly around the periphery of a central outlet 46 (FIG. 6) in sealing engagement with the interior surface of endwall 14, by a pusher plate 48 bearing against and sealing end 38 of cylinder 34. Plate 48 is secured to a flat bracket bar 52 (FIGS. 3 and 4) extending longitudinally through casing 12 and filter 30 (FIG. 1). Opposite ends 52 and 54 of bar 50 are notched so as to be threadably releasably received in the threaded central passageways 56 and 58, respectively, of ferrules 60 and 62 which are integrally connected to, and extend outwardly from, endwalls 14 and 16 respectively, along the longitudinal axis of casing 12.

Passageways 56 and 58 are continuations of, or parts of, outlet 46 and inlet 64, respectively, of endwalls 14 and 16. Thus, endwalls 14 and 16 are releasably screwed against sidewall 18 by rotating endwalls 14 and 16 and other attached ferrules 60 and 62 relative to bar 50. Access to space 28 is thereby easily obtained for replacement of components therein, cleaning, repair and subsequent reuse of device 10.

It will be noted that space 28 includes a ring-shaped permanent magnet 66 (FIG. 5) seated in an annular recess 68 in the inner face of endwall 16 and surrounding but not blocking inlet 64. A spring 70, preferably a coil spring bears against the exposed face 72 of magnet 68 and against plate 48 (FIG. 1) to hold magnet 66 in place and also to bias endwalls 14 and 16 against bar 50 to releasably lock them thereto while holding filter 30 in position in space 28. Spring 70 also has the effect of automatically compensating for slight variations in the dimensions of the various components of device 10, so as to hold them firmly in place.

Figure 2A:
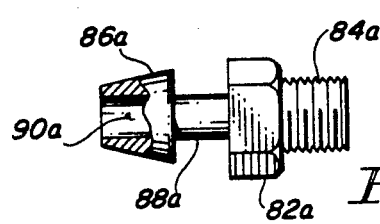
FIGS. 2a and 2b are schematic side elevations, partly broken away, of two different sizes of adaptors utilizable in the device of FIG. 1.
Figure 2B:
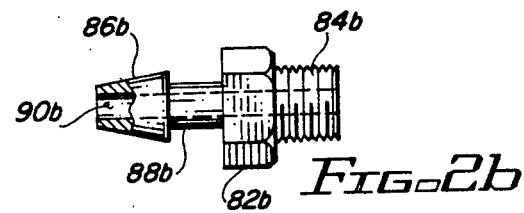

Device 10 further includes means for releasably connecting casing 12 to a fuel line 74. Thus, as shown in FIG. 1, fuel line 74 may be cut to remove a section long enough to allow installation of device 10. The result is a pair of spaced fuel line ends 76 and 78, each bearing internal fuel transporting passageway 80. Device 10 is preferably provided with a plurality, for example 3, of sets or pairs of adaptors 82. One adaptor 82 of each pair fits into ferrule 60 and the other into ferrule 62. All adaptors 82 have one externally threaded end of the same size to screw into passageway 56 or 58 and an opposite unthreaded tapered end 86 which varies in external diameter and is adapted to fit into passageway 80 and tightly bear against the internal surfaces of end 76 or 78. End 86 is connected to end 84 by rod 88. Ends 76 and 78 can be secured thereon by conventional clamps. Since the diameter of passageway 80 will vary, depending on the particular fuel line, end 86 must also vary. See, for example, adaptors 82a and 82b of FIG. 2 with ends 86a and 86b of different diameters.

All adaptors 82 have a central passageway 90 extending longitudinally therethrough so that the fuel (now shown) in line 74 can freely flow into casing 12 through inlet 64, past magnet 66, through pores 42 in filter 30, into cavity 44 and out of casing 12 through outlet 46. In so doing, such fuel has magnetically attractable particles efficiently removed by magnet 66 stationed at the inlet end of casing 12, and other particles are trapped on the exterior of sidewall 40, thereby rapidly purifying the fuel. Purified fuel exiting outlet 46 and back into line 74 is ready to be passed directly to the engine or motor for use.

Both the ferrules and the ends of the device 10 are provided with wrench flats, preferably in a hexagonal configuration to permit the use of wrenches or pliers in installing or disassembling the mating threaded parts.

Device 10 can be installed in fuel line 74 in a matter of minutes. The line is cut to establish ends 76 and 78, after which the properly sized adaptors 82, already screwed into place in ferrules 60 and 62, have their ends 86 inserted into passageways 80 at ends 76 and 78 and clamped therein. Device 10 is then fully operational. Inspection thereof is easy through transparent sidewalls 18. Casing 12 also can be opened for cleaning, etc. easily, when needed. Thus fuel line 74 usually has enough flexibility to allow endwalls 14 and 16 to be readily screwed apart so as to gain free access to space 28. Thus device 10 is inexpensive, durable, efficient, small, portable, and readily inspected, repaired, reused and replaced. Various other advantages are set forth in the foregoing.

Although there have been described above specific arrangements of an improved in-line fuel filtering device in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An in-line fuel filtering device comprising, in combination:
   (a) a generally closed casing having spaced opposite inlet and outlet-bearing endwalls interconnected by sidewalls to define a central filtering space;
   (b) a particle filter in said central space including a body having open opposite ends and porous filtering sidewalls defining therewith a central cavity in communication with said outlet through one of said open ends;
   (c) a magnet disposed in said central space outside said particle filter for trapping magnetically attractable particles;
   (d) bracket means sealing said particle filter around and in communication with said outlet in said central space and spacing said particle filter inwardly from said casing sidewalls and from said inlet, said bracket means further including a plate which abuts the outside of and seals one of said open particle filter ends and also including a bar bearing said plate and threaded at opposite ends, which bar extends longitudinally through said casing and particle filter and is releasably threadably received in said inlet and outlet to releasably secure said particle filter in place and said casing endwalls to said casing sidewalls for ready access to said particle filter and magnet; and (e) a spring in said central casing space between said plate and said magnet, said magnet being disposed in a recess at the inlet end of said casing, said magnet having an open central portion to permit free flow of liquid through said inlet into said central casing space, said spring biasing the components in said casing central space to resist movement thereof and inadvertent opening of said casing and to automatically adjust for variations in dimensions of said components.

2. The fuel filtering device of claim 1 wherein said casing sidewalls are transparent to facilitate inspection of said filter.

3. The fuel filtering device of claim 2 wherein said casing and particle filter are elongated cylinders, wherein said casing endwall inlet and outlet are disposed in internally threaded ferrules integrally connected to the exterior of said casing endwalls and extending outwardly therefrom along the longitudinal axis of said casing, and wherein said filtering device includes a plurality of pairs of adaptors having longitudinal fluid passageways extending therethrough, said adaptors being externally threaded at one end thereof for threadable connection to said ferrules and having various external diameters at the opposite end thereof for wedging connection with the interiors of fuel lines of various internal diameters.

4. The fuel filtering device of claim 3 wherein said casing sidewalls are glass, said casing endwalls, spring and bracket are metal and said particle filter is plastic, and wherein said magnet is ring-shaped and said spring is a coil spring.

5. The fuel filtering device of claim 1 wherein said said casing endwall inlet and outlet are disposed in or contiguous with internally threaded, outwardly extending ferrules, and wherein said filtering device includes a plurality of pairs of adaptors with one end thereof threadably receivable in said ferrules and having various external diameters at the opposite end thereof to facilitate connection of said device to fuel lines of various internal diameters.

* * * * *